United States Patent
Hanslik et al.

(10) Patent No.: US 11,148,662 B2
(45) Date of Patent: Oct. 19, 2021

(54) METHOD FOR CONTROLLING A HYDRAULIC SERVO STEERING SYSTEM, AND A HYDRAULIC SERVO STEERING SYSTEM IN A VEHICLE

(71) Applicant: WABCO Europe BVBA, Brussels (BE)

(72) Inventors: Daniel Hanslik, Isernhagen (DE); Stephan Kallenbach, Hannover (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 199 days.

(21) Appl. No.: 16/332,828

(22) PCT Filed: Aug. 17, 2017

(86) PCT No.: PCT/EP2017/000993
§ 371 (c)(1),
(2) Date: Mar. 13, 2019

(87) PCT Pub. No.: WO2018/050268
PCT Pub. Date: Mar. 22, 2018

(65) Prior Publication Data
US 2019/0359206 A1  Nov. 28, 2019

(30) Foreign Application Priority Data
Sep. 15, 2016 (DE) .................... 10 2016 011 093.7

(51) Int. Cl.
*B62D 5/065* (2006.01)
*B62D 9/00* (2006.01)
(Continued)

(52) U.S. Cl.
CPC ............ *B60W 30/09* (2013.01); *B62D 5/065* (2013.01); *B60W 2540/18* (2013.01);
(Continued)

(58) Field of Classification Search
CPC ........ B62D 5/065; B62D 5/063; B60W 30/09
See application file for complete search history.

(56) References Cited

U.S. PATENT DOCUMENTS 4,223,756 A * 9/1980 Bertelsbeck ........... B62D 1/265
104/242
5,913,375 A    6/1999 Nishikawa
(Continued)

FOREIGN PATENT DOCUMENTS

CN    101147010 A    3/2008
CN    103010298 A    4/2013
(Continued)

*Primary Examiner* — Thomas G Black
*Assistant Examiner* — Ana D Thomas
(74) *Attorney, Agent, or Firm* — Leydig, Voit & Mayer, Ltd.

(57) ABSTRACT

A method for controlling a hydraulic servo steering system in a vehicle includes reading out a collision warning signal to establish that a collision assistance case exists, and in response to determining that the collision assistance case exists, providing a hydraulic fluid by a hydraulic pump of the servo steering system. Serving for steering assistance has an actual volumetric flow-rate that is greater than or equal to a minimum volumetric flow-rate. The method additionally includes increasing a pump speed if the actual volumetric flow-rate is less than the minimum volumetric flow-rate, the pump speed being dependent on an engine/motor speed of a drive engine/motor interacting with the hydraulic pump.

24 Claims, 2 Drawing Sheets

(51) Int. Cl.
*B60W 30/09* (2012.01)
*B62D 15/02* (2006.01)

(52) U.S. Cl.
CPC ......... *B60W 2554/00* (2020.02); *B62D 9/005* (2013.01); *B62D 15/0265* (2013.01)

(56) References Cited

U.S. PATENT DOCUMENTS

| | | | |
|---|---|---|---|
| 7,240,485 B2 | 7/2007 | Namuduri et al. | |
| 8,403,103 B1 | 3/2013 | Williams | |
| 2007/0039774 A1 | 2/2007 | Williams | |
| 2007/0251754 A1* | 11/2007 | Webert | B62D 5/065 180/417 |
| 2007/0257550 A1 | 11/2007 | Offerle et al. | |
| 2010/0193272 A1 | 8/2010 | Jacobsen et al. | |
| 2010/0322807 A1 | 12/2010 | Kimura | |
| 2011/0313621 A1 | 12/2011 | Williams | |
| 2016/0272171 A1 | 9/2016 | Bunk | |

FOREIGN PATENT DOCUMENTS

| | | |
|---|---|---|
| CN | 105189218 A | 12/2015 |
| CN | 105835946 A | 8/2016 |
| DE | 19635009 A1 | 3/1997 |
| DE | 102005038985 A1 | 4/2006 |
| DE | 102005060536 A1 | 6/2007 |
| DE | 102007016112 A1 | 11/2007 |
| DE | 102010005889 A1 | 8/2010 |
| DE | 102010023735 A1 | 1/2011 |
| DE | 102015014882 A1 | 6/2016 |
| JP | 59118575 A | 7/1984 |
| JP | 62227864 A | 10/1987 |
| JP | 03082675 A | 4/1991 |
| JP | 2000159137 A | 6/2000 |
| JP | 2007253829 A | 10/2007 |
| JP | 2007269312 A | 10/2007 |
| JP | 2013248986 A | 12/2013 |

* cited by examiner

METHOD FOR CONTROLLING A HYDRAULIC SERVO STEERING SYSTEM, AND A HYDRAULIC SERVO STEERING SYSTEM IN A VEHICLE

CROSS REFERENCE TO RELATED APPLICATIONS

This application is a U.S. National Stage Application under 35 U.S.C. § 371 of International Application No. PCT/EP2017/000993 filed on Aug. 17, 2017, and claims benefit to German Patent Application No. DE 10 2016 011 093.7 filed on Sep. 15, 2016. The International Application was published in German on Mar. 22, 2018, as WO 2018/050268 A1 under PCT Article 21(2).

FIELD

The invention relates to a method for controlling a hydraulic servo steering system and also to a hydraulic servo steering system in a vehicle, in particular a utility vehicle.

BACKGROUND

In vehicles, in particular utility vehicles, a servo steering system is provided for the purpose of assisting a steering demand which is preset by a driver or by an automated steering system. This servo steering system exhibits a hydraulic pump which is connected to an arbitrary steering mechanism via a hydraulic line. The steering mechanism converts the steering demand mechanically into a steering motion of wheels of the vehicle.

For the purpose of assisting the steering, a hydraulic fluid which is conveyed to the steering mechanism is provided by the hydraulic pump. The hydraulic pump in this case is powered by an engine/motor, the power of which, or the speed of which, determines an actual volumetric flow-rate of the hydraulic fluid, since, depending on the speed of the engine/motor, a pump speed is set that leads to a defined actual volumetric flow-rate. The hydraulic fluid in the steering mechanism acts in such a manner that the mechanical conversion of the steering demand into a steering motion is assisted, the steering assistance taking place in such a manner that a higher steering speed can be attained in the case of a higher actual volumetric flow-rate which is provided.

In DE 10 2015 014 882 A1 a servo steering system is described, the hydraulic pump of which is operated by a motor, said hydraulic pump being actuated if a steering demand has been established. The power of the motor in this case determines the actual volumetric flow-rate of the hydraulic fluid, so that, depending upon the level of the steering demand, a sufficient actual volumetric flow-rate can be provided by appropriate setting of the speed of the motor. An automated steering system can also act in assisting manner on a steering strut via a motor, so that an automated steering is also made possible. In the event of a failure of the motor, the hydraulic pump can be operated by a starter motor, so that the hydraulic pump can again convey with a certain actual volumetric flow-rate, so that an acceptable performance of the hydraulic servo steering system can be guaranteed even in the event of a failure of the motor.

In JP2007269312A2 a purely electronic servo steering system is described which is able to assist the steering via an electric motor. The level of the steering assistance is set in this case as a function of a capture of the environment, by a check being carried out as to whether or not a steering assistance is necessary on the basis of the current environment of the vehicle.

In DE 10 2007 016 112 a hydraulic steering-and-braking assistance is presented. According to this patent, there is provision to set a pump speed of the hydraulic pump in speed-dependent manner, said hydraulic pump being driven by an engine/motor. The actuation of the hydraulic pump in this case is effected as soon as a steering action has been detected, the type of the actuation being dependent on how big the speed-dependent demand is that is to say, which actual volumetric flow-rate is in fact necessary. As a result, it is to be ensured that a sufficient steering-and-braking assistance can be provided on demand, and at the same time that the usage of surplus energy can be reduced when there is no demand.

SUMMARY

In an embodiment, the present invention provides a method for controlling a hydraulic servo steering system in a vehicle. The method includes reading out a collision warning signal to establish that a collision assistance case exists, and in response to determining that the collision assistance case exists, providing a hydraulic fluid by a hydraulic pump of the servo steering system. Serving for steering assistance has an actual volumetric flow-rate that is greater than or equal to a minimum volumetric flow-rate. The method additionally includes increasing a pump speed if the actual volumetric flow-rate is less than the minimum volumetric flow-rate, the pump speed being dependent on an engine/motor speed of a drive engine/motor interacting with the hydraulic pump.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
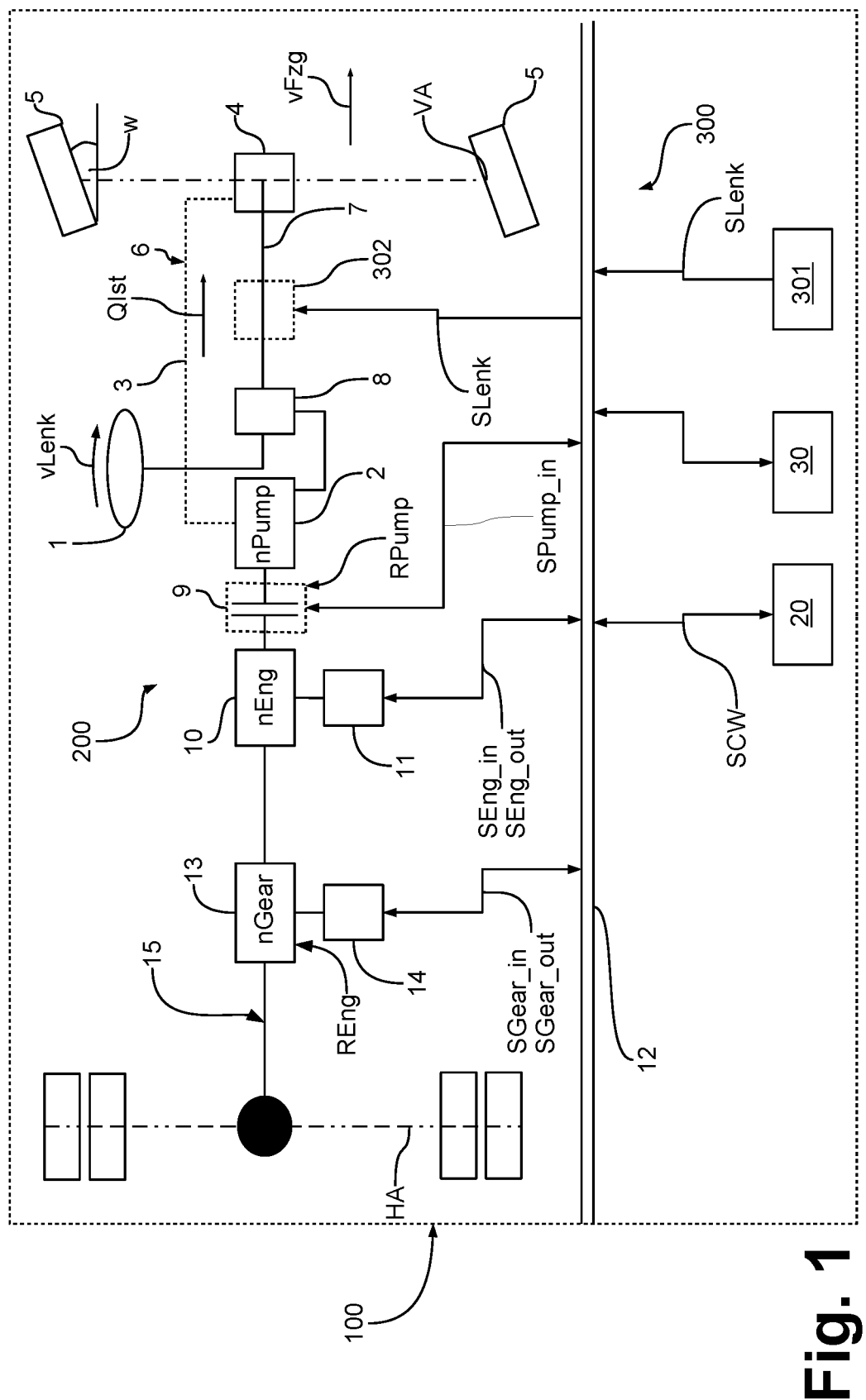
FIG. 1 illustrates a schematic view of a vehicle with a hydraulic servo steering system.

Embodiments of the invention provide methods for controlling a hydraulic servo steering system, with which a reliable steering assistance with high steering speed can be guaranteed in the event of an impending collision. Furthermore, embodiments of the invention provide hydraulic servo steering systems.

In accordance with the invention, for this purpose there is provision to check, after the establishing of an impending collision of the vehicle in question with a collision object, whether a hydraulic fluid provided by a hydraulic pump of a servo steering system of the vehicle and serving for steering assistance has an actual volumetric flow-rate that is greater than or equal to a minimum volumetric flow-rate. If this is not the case, in accordance with the invention a pump speed of the hydraulic pump is increased.

This is preferentially effected by increasing a speed of a drive engine/motor of the vehicle, for instance a speed of an internal-combustion engine or of an electrically operated motor, which has been actively linked mechanically with the hydraulic pump of the servo steering system. An increase of the speed of the drive engine/motor accordingly also results immediately in an increase of the pump speed of the hydraulic pump, by virtue of which, in turn, the actual volumetric flow-rate which is provided rises.

Advantageously, by an increase of the speed of the drive engine/motor of the vehicle the actual volumetric flow-rate which is provided can consequently be increased at least to the minimum volumetric flow-rate. Alternatively or additionally, a pump gear ratio, which sets the gear ratio between the drive engine/motor and the hydraulic pump, can also be changed, for instance via a pump gearing arranged between the drive engine/motor and the hydraulic pump. As a result, in the event of constant or only slightly increased speed of the engine/motor a greater increase of the pump speed and consequently of the actual volumetric flow-rate can be attained.

The minimum volumetric flow-rate in this case is chosen in such a manner that a steering action with at least a maximal steering angle, in order in the event of a collision to lessen the consequences of an accident by evasive action, can be assisted with a sufficiently high steering speed, for example 400-500° steering-wheel angle per second.

Since this increase is coupled to the establishing of an impending collision, advantageously an increased actual volumetric flow-rate is already provided when, as a consequence of the detected collision, a steering demand does not yet exist and consequently it is not yet certain whether the vehicle is to actually carry out a steering action. The increase of the actual volumetric flow-rate is consequently not coupled to a steering demand. Consequently, a sufficient actual volumetric flow-rate can be provided already in preparation for the case where the driver or an automated steering system intervenes as a consequence of the impending collision, and not only when a steering demand actually exists.

Within the scope of the invention, an internal-combustion engine or an electrically operated motor—the drive unit of the vehicle—is understood, for example, by way of drive engine/motor of the vehicle. That is to say, the drive engine/motor presets an engine/motor speed which via a vehicle gearshift transmission, for example an automated transmission (AMT) or an automatic transmission (AT), with which an engine/motor gear ratio can be set, is transmitted to a drive shaft of a drivetrain of the vehicle. Via the drive shaft, wheels of the vehicle are driven, for instance the wheels of a rear axle or of several rear axles of the vehicle. Consequently, both a vehicle speed of the vehicle and a pump speed of the hydraulic pump are set as a function of the engine/motor speed of the drive engine/motor.

An uncoupling of the hydraulic pump from the drive engine/motor is preferentially not provided in this case that is to say, as soon as the drive engine/motor is being driven at the engine/motor speed the hydraulic pump is also driven automatically at a defined pump speed by virtue of the mechanical connection to the hydraulic pump.

Preferentially, checking whether the actual volumetric flow-rate is greater than or equal to the minimum volumetric flow-rate, and hence whether a sufficient actual volumetric flow-rate is being provided for a steering assistance in the event of an impending collision, is ascertained by evaluation of the speed of the drive engine/motor. This is possible, since these are directly related.

Accordingly, the engine/motor speed is, for instance, firstly ascertained via an engine/motor output signal communicated from an engine/motor control unit of the drive engine/motor, said engine/motor control unit itself measuring the engine/motor speed. But, alternatively or additionally, the engine/motor speed can also be ascertained from a current vehicle speed, taking into consideration the engine/motor gear ratio of the vehicle gearshift transmission arranged between the drive engine/motor and the drive shaft of the vehicle if a defined vehicle-transmission gear has been engaged in the vehicle gearshift transmission.

The engine/motor gear ratio for the engaged vehicle-transmission gear may, for instance, have been stored in a transmission control unit or may be ascertained during the trip, by an engine/motor gear ratio for the corresponding vehicle-transmission gear being estimated or calculated from the engine/motor speed and from a transmission output speed transmitted to the drive shaft.

From the engine/motor speed the actual volumetric flow-rate is advantageously ascertained, by the pump speed of the hydraulic pump being determined which follows immediately from the engine/motor speed by reason of the mechanical connection—for instance, toothed wheels or belt—between drive engine/motor and hydraulic pump. If available, the pump gear ratio of the pump gearing arranged between the drive engine/motor and the hydraulic pump has to be taken into consideration. The actual volumetric flow-rate then follows from the pump speed via a pump characteristic assigned to the hydraulic pump.

Alternatively, the actual volumetric flow-rate can also be measured directly in a hydraulic line leading from the hydraulic pump to a steering mechanism, in which the hydraulic fluid is conveyed to the steering mechanism in order to assist the steering mechanism in the course of the mechanical translation of the steering demand into a steering motion.

According to an advantageous version, for the purpose of increasing the engine/motor speed of the drive engine/motor in case the actual volumetric flow-rate is less than the minimum volumetric flow-rate and an impending collision has been established, there is provision firstly to check whether a defined vehicle-transmission gear has been engaged by the vehicle gearshift transmission or the vehicle gearshift transmission has been disengaged that is to say, an idling state has been set. This can be effected, for instance, by a transmission output signal which has been output from the transmission control unit of the vehicle gearshift transmission being evaluated that specifies which vehicle-transmission gear has been engaged or whether the vehicle gearshift transmission is in the idling state.

If the vehicle gearshift transmission is in the idling state, the engine/motor speed can be increased merely by a direct actuation of the drive engine/motor. For this purpose, an engine/motor control signal is preferentially output to an engine/motor control unit of the drive engine/motor, by reason of which an increase of the engine/motor speed is effected, said engine/motor speed being increased until such time as the actual volumetric flow-rate is greater than or equal to the minimum volumetric flow-rate. This is again established via the pump characteristic, given knowledge of the pump speed which is likewise increased by virtue of the increase of the engine/motor speed.

If it is established that a defined vehicle-transmission gear has been engaged by the vehicle gearshift transmission, and consequently a defined engine/motor gear ratio exists, a transmission control signal is output to the transmission control unit of the vehicle gearshift transmission, by reason of which the set vehicle-transmission gear is decreased. By reason of the decreasing of the set vehicle-transmission gear, at the same time the engine/motor speed is increased, since the engine/motor gear ratio changes by virtue of the lower vehicle-transmission gear. In this case, the vehicle-transmission gear is decreased until such time as an engine/motor speed arises that leads to an actual volumetric flow-rate that is greater than or equal to the minimum volumetric flow-rate. Given knowledge of the engine/motor gear ratio, the correct vehicle-transmission gear can advantageously be set at once, without shifting in between.

Additionally, for the purpose of increasing the engine/motor speed in the idling state or, additionally or alternatively, for the purpose of decreasing the vehicle-transmission gear, there may be provision to change the pump gear ratio of the pump gearing, in order to increase the pump speed and consequently the actual volumetric flow-rate. That is to say, by setting of a suitable pump-transmission gear in the pump gearing the pump speed and consequently the actual volumetric flow-rate can be increased, even at low engine/motor speeds, for example at high vehicle speeds on the freeway, with few steering motions and in particular in order to save fuel, by decreasing the pump-transmission gear after establishment of an impending collision. As a result, a changing of the vehicle-transmission gear may advantageously be omitted or may be effected to a lesser extent, and a direct increasing of the engine/motor speed in the idling state may also turn out to be slighter.

Consequently, either by a changing of the vehicle-transmission gear or by a direct demand for the purpose of increasing the engine/motor speed if the idling state has been engaged, and/or by changing the pump-transmission gear, the pump speed and consequently the actual volumetric flow-rate can be raised. This has no immediate effects on handling, since in the idling state merely the engine/motor speed is changed, and with vehicle-transmission gear engaged—that is to say, if the vehicle is being driven—merely the engine/motor gear ratio is altered, which, however, has no significant effects on the current vehicle speed. A change of the pump-transmission gear likewise has no effects on automotive operation.

For the purpose of establishing an impending collision, an emergency braking system (AEBS), for instance, may be present in the vehicle, which via an emergency-braking control unit implements a monitoring and evaluation of the surround field and as a result is able to detect an impending collision with a collision object. Depending thereon, a collision warning signal can be output—for instance via a data-bus connection in the vehicle, for example via a CAN bus, Flexray, Ethernet, etc.—which starts the check as to whether the actual volumetric flow-rate is sufficient for a steering assistance.

Altogether, the signals at least from and to the engine/motor control unit, transmission control unit, emergency-braking control unit and to the pump gearing are transmitted via the data-bus connection, in order that a transmission of signals to a servo control unit, by which the setting of the actual volumetric flow-rate in the event of an impending collision is controlled by increasing the engine/motor speed or the pump speed, can be facilitated and accelerated. As a result, an increase of the actual volumetric flow-rate can be demanded quickly in the case where a collision warning signal exists, so that a sufficient steering assistance can be ensured even in the event of immediate intervention in the steering by reason of the impending collision.

The steering demand that is to be assisted in the event of an impending collision may be preset, for instance manually by the driver via a steering-wheel or alternatively by an automated steering system which demands a steering action, for instance via an electric motor, if an impending collision has been detected. In both cases, a preset—manually by the driver or in automated manner by the electric motor—steering demand is transmitted mechanically to the steering mechanism, and the latter is assisted hydraulically by the servo steering.

In the embodiment according to FIG. 1, a vehicle 100 is shown schematically which exhibits a hydraulic servo steering system 200, said hydraulic servo steering system 200 being optionally capable of being electrically assisted by an automated steering system 300. The hydraulic servo steering system 200 serves as steering assistance as soon as a steering demand ALenk by a driver or by the optional automated steering system 300 exists, said steering assistance bringing about a situation where a higher steering speed vLenk can be attained in the case of a preset steering demand ALenk, for instance by rotation of a steering-wheel 1.

For this purpose the hydraulic servo steering system 200 exhibits a hydraulic pump 2 which is fluidically connected to a steering mechanism 4 via a hydraulic line 3. If the hydraulic pump 2 is being driven, a hydraulic fluid 6 having a defined actual volumetric flow-rate QIst can be provided by the hydraulic pump 2, said actual volumetric flow-rate QIst being dependent, in particular, on a pump speed nPump at which the hydraulic pump 2 is rotating. The hydraulic fluid 6 is conveyed to the steering mechanism 4, said steering mechanism 4 converting the steering demand ALenk mechanically into a steering motion of wheels 5 of a front axle VA of the vehicle 100. By virtue of the hydraulic fluid 6, the mechanical conversion of the steering demand ALenk into the steering motion can be assisted in suitable manner, depending upon the actual volumetric flow-rate QIst, so that a steering assistance can be guaranteed that can guarantee a higher steering speed vLenk in the case of higher actual volumetric flow-rates QIst.

The steering demand ALenk can be preset either by the driver, by rotating the steering-wheel 1, or alternatively by the automated steering system 300 which is formed, in particular, by a steering control unit (EMA-ECU) 301 as well as an electric motor 302. The steering control unit 301 is designed to steer the vehicle 100, particularly in the event of an impending collision, in automated manner and for this purpose to actuate the electric motor 302 in automated manner via a steering signal SLenk. The electric motor 302—assisted by the servo steering system 200—then acts in arbitrary manner on the steering mechanism 4, in order to bring about a steering motion of the wheels 5. In the event of a manual rotation of the steering-wheel 1 by the driver, a steering strut 7, for instance, which has been actively linked with the steering mechanism 4 is set in rotation.

For the purpose of steering assistance, the hydraulic pump 2 may have been actively linked with a suitable steering sensor 8, so that via the steering sensor 8 it can be established whether a torsion of the steering strut 7 exists and consequently a steering action by a defined steering angle w has been demanded.

According to the embodiment example in FIG. 1, the hydraulic pump 2 is mechanically connected via an optional pump gearing 9 to a drive engine/motor 10 of the vehicle 100, for instance to an internal-combustion engine or to an electrically operated motor, for instance via a toothed belt or a toothed wheel. As a result, a rotation of the drive engine/motor 10 at an engine/motor speed nEng is transmitted automatically also to the hydraulic pump 2, so that the pump speed nPump of the hydraulic pump 2 is dependent on the engine/motor speed nEng of the drive engine/motor 10. That is to say, as soon as the drive engine/motor 10 is being driven, the hydraulic pump 2 also starts to run automatically. Accordingly, the actual volumetric flow-rate QIst is also dependent on the engine/motor speed nEng of the drive engine/motor 10.

Via the pump gearing 9, a pump gear ratio RPump can optionally be set, it being possible for the pump gear ratio RPump also to be altered by setting of a pump-transmission gear PG. As a result, a high pump speed nPump can be set even at low engine/motor speeds nEng. The pump-transmission gear PG in this case can be set as a function of a pump control signal SPump_in.

The drive engine/motor 10 is controlled by an engine/motor control unit 11 which is designed to set the engine/motor speed nEng, for which purpose an engine/motor control signal SEng_in can be preset for the engine/motor control unit 11, for instance via a data-bus connection 12 of the vehicle 100, for instance a CAN bus. Furthermore, the engine/motor control unit 11 can output the current engine/motor speed nEng via an engine/motor output signal SEng_out, for instance likewise to the data-bus connection 12.

The drive engine/motor 10 is furthermore connected via a vehicle gearshift transmission 13 to a drive shaft 15 leading to a rear axle HA of the vehicle 100, so that via the vehicle gearshift transmission 13 the wheels 5 of the rear axle HA can be driven at a transmission output speed nGear as a function of a set engine/motor gear ratio REng. The vehicle gearshift transmission 13 has been realized, for instance, as a transmission controlled in automated manner (AMT) or as an automatic transmission (AT), which can each be controlled via a transmission control unit 14. Via the transmission control unit 14, a vehicle-transmission gear GF corresponding to the current driving situation—that is to say, a corresponding engine/motor gear ratio REng—or optionally also the idling state L by reason of a fuel-saving function can be set automatically by, for instance, declutching being effected, so that the drive engine/motor 10 can also optionally be operated in fuel-saving manner.

Furthermore, a transmission control signal SGear_in can be preset for the transmission control unit 14, for instance via the data-bus connection 12, by reason of which the vehicle gearshift transmission 13 can be disengaged in automated manner and can be shifted into the idling state L or into a defined vehicle-transmission gear GF. Thereupon a defined engine/motor gear ratio REng is set by the vehicle gearshift transmission 13. In addition, via a transmission output signal SGear_out the transmission control unit 14 can output, for instance to the data-bus connection 12, which vehicle-transmission gear GF has been engaged or whether the vehicle gearshift transmission 13 is in the idling state L. Optionally, the engine/motor gear ratio REng assigned to the respective vehicle-transmission gear GF and also the current transmission output speed nGear can also be transmitted to the data-bus connection 12 via the transmission output signal SGear_out.

For the purpose of steering assistance according to the invention, after detection of an impending collision—that is to say, in a collision assistance case A—an emergency-braking control unit (AEBS-ECU) 20 and also a servo control unit 30 have additionally been linked to the data-bus connection 12. If an automated steering system 300 is present in the vehicle 100, the servo control unit 30 may also have been integrated within the steering control unit 301.

The emergency-braking control unit 20 is, for instance, part of an emergency braking system (AEBS) which can detect an impending collision with a collision object O on the basis of a monitoring of the surround field and can react appropriately thereto, for instance with a demand for emergency braking. If an impending collision with a collision object O is detected, a collision warning signal SCW is output to the data-bus connection 12 by the emergency-braking control unit 20. This collision warning signal SCW can, at the same time, be received by the servo control unit 30 via the data-bus connection 12.

If a collision warning signal SCW exists, the collision assistance case A arises, and in accordance with the invention the servo control unit 30 ensures that an appropriate actual volumetric flow-rate QIst for a sufficient steering assistance in the collision assistance case A is provided by the hydraulic pump 2. As a result, it is to be ensured that in the event of an impending collision a hydraulic fluid 6 is available with a sufficiently high actual volumetric flow-rate QIst in case the driver or optionally also the automated steering system 300 in the collision assistance case A would like to swerve with a high steering angle w to evade the collision object O. Consequently a reaction occurs not just when the driver or the automated steering system 300 begins a steering action and via the steering sensor 8 a steering demand ALenk has been detected, but rather already when an impending collision has been detected and has been output via the data-bus connection 12.

In order to ensure a sufficient steering assistance, the servo control unit 30 checks whether the actual volumetric flow-rate QIst currently provided, which is determined by the current pump speed nPump, lies above a minimum volumetric flow-rate QMin. The minimum volumetric flow-rate QMin has in this case been adjusted in such a manner that a sufficient steering assistance with high steering angle w at high steering speed vLenk can be ensured in the collision assistance case A. Since, according to this embodiment, the servo control unit 30 does not measure the actual volumetric flow-rate QIst directly, the servo control unit 30 calculates the actual volumetric flow-rate QIst from the information transmitted via the data-bus connection 12.

For this purpose, firstly the transmission output signal SGear_out is evaluated. That is to say, a check is carried out as to which vehicle-transmission gear GF has been engaged or whether the idling state L has been set. If a defined vehicle-transmission gear GF has been engaged, the engine/motor speed nEng can be estimated from the engine/motor gear ratio REng transmitted via the transmission output signal SGear_out, together with a currently measured vehicle speed vFzg. If no engine/motor gear ratio REng is transmitted via the transmission output signal SGear_out, said engine/motor gear ratio can be also acquired in advance during the trip, by the transmission output speed nGear supplied to the rear axle HA being compared with the engine/motor speed nEng.

Alternatively, recourse may be had directly to the engine/motor speed nEng transmitted via the engine/motor output signal SEng_out. This is necessary when, for instance, it has been established via the transmission output signal SGear_out that the idling state L has been set and consequently no torque is being transmitted to the rear axle HA via the vehicle gearshift transmission 13 and therefore a calculation of the engine/motor speed nEng from the engine/motor gear ratio REng is not possible.

From the engine/motor speed nEng ascertained by this means, the servo control unit 30 can subsequently ascertain the pump speed nPump, where appropriate taking into consideration the pump gear ratio RPump that has been set via the pump-transmission gear GP. The actual volumetric flow-rate QIst to be expected follows from this pump speed nPump via a pump characteristic K which specifies the relationship of pump speed nPump to actual volumetric flow-rate QIst for the particular hydraulic pump 2. The pump characteristic K has, for instance, been stored in the servo control unit 30 or is provided by the hydraulic pump 2. If the actual volumetric flow-rate QIst is too low—that is to say, if it lies below the minimum volumetric flow-rate QMin established in advance—an appropriate demand is made by the servo control unit 30 for the purpose of increasing the actual volumetric flow-rate QIst at least to the level of the minimum volumetric flow-rate QMin.

For this purpose, a check is firstly carried out by the servo control unit 30 via the transmission output signal SGear_out as to whether a vehicle-transmission gear GF has been engaged or whether the idling state L has been set.

If the idling state L has been set, a demand is output to the engine/motor control unit 11 by the servo control unit 30 via the data-bus connection 12 and via the engine/motor control signal SEng_in for the purpose of increasing the engine/motor speed nEng. The engine/motor speed nEng is then increased until such time as a pump speed nPump is attained, for which, on the basis of the pump characteristic K, an actual volumetric flow-rate QIst follows that lies above the minimum volumetric flow-rate QMin, so that a sufficient actual volumetric flow-rate QIst for the collision assistance case A can be provided to the steering mechanism 4.

If, on the other hand, it follows from the transmission output signal SGear_out that a defined vehicle-transmission gear GF has been engaged, instead a demand is output to the transmission control unit 14 by the servo control unit 30 via the data-bus connection 12 and via the transmission control signal SGear_in for the purpose of decreasing the vehicle-transmission gear GF. By virtue of a decreasing of the vehicle-transmission gear GF, it is automatically ensured that the engine/motor speed nEng increases, since the vehicle speed vFzg changes slightly, if at all, merely by virtue of engine/motor braking. At the same time, the pump speed nPump and also the actual volumetric flow-rate QIst also increase. Which vehicle-transmission gear GF needs to be set exactly, in order to attain the minimum volumetric flow-rate QMin, follows from the current vehicle speed vFzg, from the engine/motor gear ratio REng and from the pump gear ratio RPump, which establish the requisite engine/motor speed nEng which, via the pump characteristic K, leads to the attaining of the minimum volumetric flow-rate QMin.

In this case, given knowledge of the engine/motor gear ratio REng, shifting into the correct vehicle-transmission gear GF can also be effected at once, without—starting from the current vehicle-transmission gear GF—shifting into the vehicle-transmission gears GF lying in between.

Additionally, in the idling state L and, additionally or alternatively, with vehicle-transmission gear GF engaged, the pump speed nPump can also be attained via a change of the pump-transmission gear GP. Accordingly, a demand for the purpose of decreasing the pump-transmission gear GP can be output by the servo control unit 30 via the data-bus connection 12 via the pump control signal SPump_in. As a result, a high pump speed nPump can be set also at low engine/motor speeds nEng by reason of a high vehicle-transmission gear GF or in the idling state L at low engine/motor speeds nEng, without in the process changing the vehicle-transmission gear GF or directly increasing the engine/motor speed nEng excessively.

Figure 2:
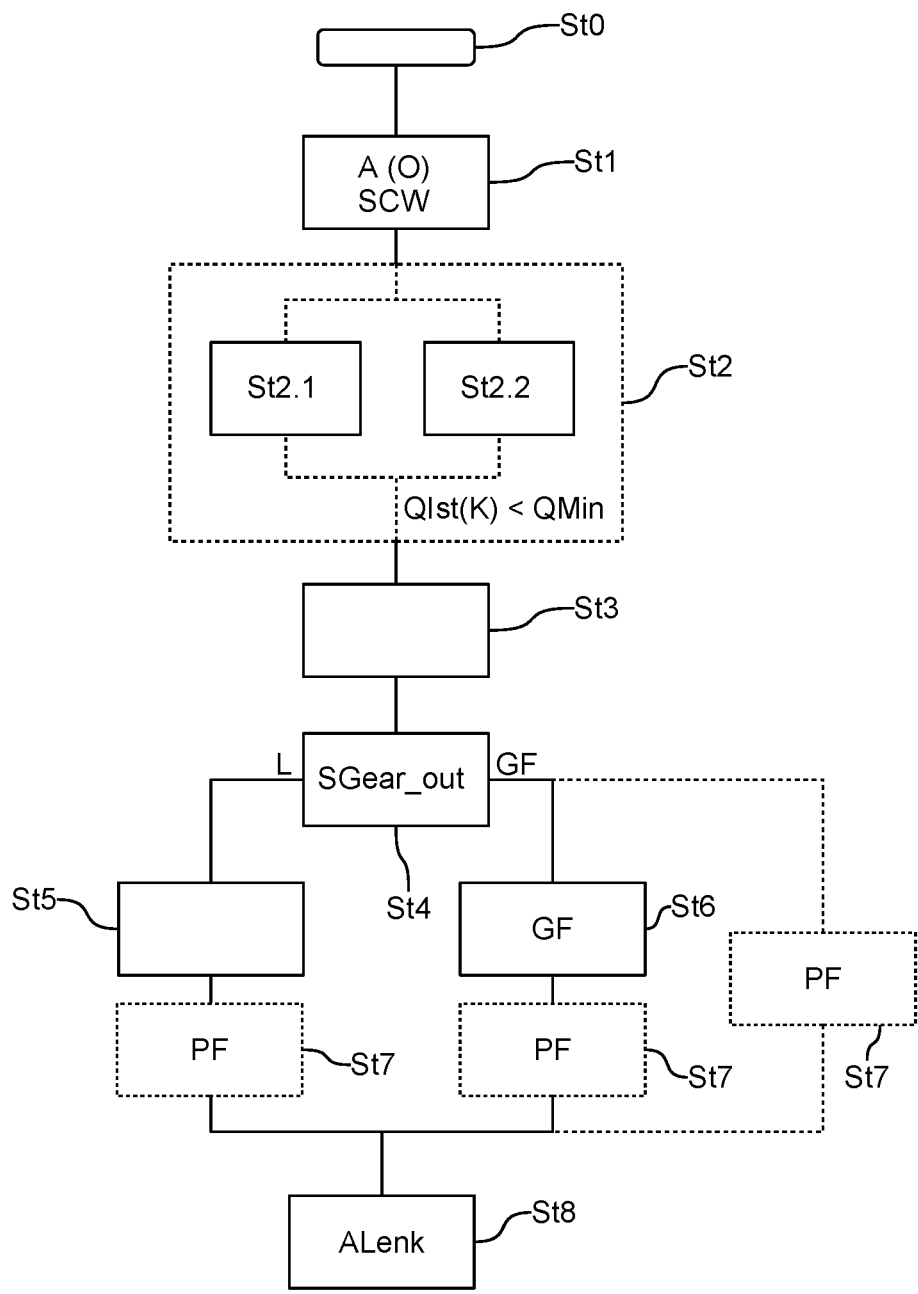
FIG. 2 illustrates a flowchart for implementing a method according to an embodiment of the invention.

The method according to the invention can according to FIG. 2 be executed in the following manner, for instance.

In an initial step St0, the hydraulic servo steering system 200 is initialized, for instance with the starting of the vehicle 100.

In a first step St1, a check is carried out by the servo control unit 30 as to whether a collision assistance case A exists—that is to say, whether a collision warning signal SCW has been output to the data-bus connection by the emergency-braking control unit 20 because an impending collision with a collision object O has been detected.

If this is the case, in a second step St2 a check is carried out as to whether an actual volumetric flow-rate QIst follows from the engine/motor speed nEng that is lower than a minimum volumetric flow-rate QMin which is necessary in order to provide a sufficient steering assistance via the hydraulic servo steering system 200 in the collision assistance case A.

For this purpose, in a first partial step St2.1 either on the basis of the current vehicle speed vFzg and also of the engine/motor gear ratio REng a check is carried out as to whether a current engine/motor speed nEng exists that leads to a pump speed nPump from which, via a pump characteristic K, a sufficient actual volumetric flow-rate QIst follows that is greater than or equal to the minimum volumetric flow-rate QMin. Alternatively, in a second partial step St2.2 the engine/motor speed nEng can be read out directly by the engine/motor control unit 11, in order to infer the current actual volumetric flow-rate QIst.

In a third step St3, in the case where it is established that the actual volumetric flow-rate QIst is lower than the minimum volumetric flow-rate QMin, a demand is output by the servo control unit 30 to the data-bus connection 12 that the engine/motor speed nEng and/or the pump speed nPump has/have to be increased, in order to increase automatically also the actual volumetric flow-rate QIst. For this purpose, in a fourth step St4 a check is firstly carried out as to whether the vehicle gearshift transmission 13 has engaged a defined vehicle-transmission gear GF or the idling state L has been set. This is effected by evaluating the transmission output signal SGear_out.

If the idling state L has been engaged, in order for instance to save fuel, in a fifth step St5 a demand is output directly to the engine/motor control unit 11 by the servo control unit 30 via the engine/motor control signal SEng_in to increase the engine/motor speed nEng directly. In this case, an engine/motor speed nEng is demanded that leads to an actual volumetric flow-rate QIst that is greater than or equal to the minimum volumetric flow-rate QMin. This is effected by taking into consideration the pump gear ratio RPump and also the pump characteristic K via which the actual volumetric flow-rate QIst to be expected follows from the demanded engine/motor speed nEng.

If, on the other hand, a vehicle-transmission gear GF has been engaged, in a sixth step St6, instead of the fifth step St5, shifting is effected into a lower vehicle-transmission gear GF via the transmission control signal SGear_in, by reason of which an increased engine/motor speed nEng is set automatically that leads to an increased pump speed nPump and to an increased actual volumetric flow-rate QIst. Here too, the vehicle-transmission gear GF is again chosen in such a manner that an actual volumetric flow-rate QIst arises that is greater than the minimum volumetric flow-rate QMin, in order to ensure a sufficient steering assistance in the collision assistance case A.

In a seventh step St7, which can optionally be implemented additionally to the fifth step St5 and additionally or alternatively to the sixth step St6, the pump gear ratio RPump is altered via the pump control signal SPump_in, by shifting being effected into a lower pump-transmission gear GP, in order also at low engine/motor speeds nEng to attain a pump speed nPump that raises the actual volumetric flow-rate QIst at least to the minimum volumetric flow-rate QMin.

Consequently, in an eighth step St8 a sufficient actual volumetric flow-rate QIst can be provided in case a steering demand ALenk is made by the driver via the steering-wheel 1 or by the automated steering system 300 via the electric motor 302 as a consequence of the collision assistance case A, in order to go around the collision object O.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS 1 steering-wheel
2 hydraulic pump
3 hydraulic line
4 steering mechanism
5 wheels
6 hydraulic fluid
7 steering strut
8 steering sensor
9 pump gearing
10 drive motor
11 engine/motor control unit
12 data-bus connection
13 vehicle gearshift transmission
14 transmission control unit
15 drive shaft
20 emergency-braking control unit (AEBS-ECU)
30 servo control unit
100 vehicle
200 hydraulic servo steering system
300 automated steering system
301 steering control unit (EMA-ECU)
302 electric motor
A collision assistance case
ALenk steering demand
GP pump-transmission gear
GF vehicle-transmission gear
HA rear axle
K pump characteristic
L idling state
nPump pump speed
nEng engine/motor speed
nGear transmission output speed
O collision object
QIst actual volumetric flow-rate
QMin minimum volumetric flow-rate
REng engine/motor gear ratio
RPump pump gear ratio
SLenk steering signal
SEng_in engine/motor control signal
SEng_out engine/motor output signal
SGear_in transmission control signal
SGear_out transmission output signal
SCW collision warning signal
VA front axle
vFzg vehicle speed
vLenk steering speed
w steering angle
St0, St1, St2, St2.1, St2.2, St3, St4, St5, St6, St7, St8 steps of the method

The invention claimed is:

1. A method for controlling a hydraulic servo steering system in a vehicle, the method comprising:
receiving a collision warning signal, which establishes that a collision assistance case exists;
in response to the collision warning signal, determining whether a current hydraulic fluid flow-rate is greater than or equal to a predetermined minimum flow-rate;
based on determining that the current hydraulic fluid flow rate is less than the predetermined minimum flow-rate, increasing a pump speed of a hydraulic pump of the servo steering system;
wherein the pump speed being is dependent on an engine/motor speed of a drive engine/motor.

2. The method as claimed in claim 1, further comprising increasing the pump speed by increasing the engine/motor speed of the drive engine/motor of the vehicle, the drive engine/motor interacting with the hydraulic pump in such a manner that, by virtue of the increasing of the engine/motor speed, the current flow-rate of the hydraulic fluid is increased.

3. The method as claimed in claim 2, wherein increasing the engine/motor speed of the drive engine/motor comprises carrying out a check as to whether a defined vehicle-transmission gear has been engaged by a vehicle gearshift transmission of the vehicle or an idling state has been set, wherein for this purpose a transmission control unit of the vehicle gearshift transmission outputs a transmission output signal that specifies which vehicle-transmission gear has been engaged or whether the vehicle gearshift transmission is in the idling state.

4. The method as claimed in claim 3, further comprising:
based on establishing that the vehicle gearshift transmission is in the idling state, outputting an engine/motor control signal to an engine/motor control unit of the drive engine/motor, which causes a direct increase of the engine/motor speed and consequently an increase of the current flow-rate occurs.

5. The method as claimed in claim 3, further comprising:
based on establishing that a defined vehicle-transmission gear has been engaged by the vehicle gearshift transmission, outputting a transmission control signal to the transmission control unit of the vehicle gearshift transmission, wherein the transmission control signal causes the vehicle-transmission gear that has been set to decrease, wherein due to the decreasing of the set vehicle-transmission gear, the engine/motor speed is increased by changing the engine/motor gear ratio, and consequently an increase of the current flow-rate occurs.

6. The method as claimed in claim 1, further comprising increasing the pump speed by changing a pump gear ratio defined by a pump gearing between the hydraulic pump and the drive engine/motor.

7. The method as claimed in claim 6, wherein for the purpose of changing the pump gear ratio, a pump-transmission gear is decreased, whereby by reason of the decreasing of the set pump-transmission gear, the pump speed is increased by changing the pump gear ratio, and consequently an increase of the current flow-rate occurs.

8. The method as claimed in claim 1, wherein the engine/motor speed and/or the pump gear ratio is/are set in such a manner that the current flow-rate is greater than or equal to the minimum flow-rate, whereby for this purpose the vehicle-transmission gear and/or the pump-transmission gear is/are decreased to such an extent, or in the idling state an engine/motor control signal is output to the engine/motor control unit of the drive engine/motor, and/or the pump-transmission gear is decreased to such an extent, that an engine/motor speed arises that leads to the current flow-rate being greater than or equal to the minimum volumetric flow-rate.

9. The method as claimed in claim 1, further comprising ascertaining the engine/motor speed of the drive engine/motor for the purpose of checking whether the current flow-rate is greater than or equal to the minimum flow-rate.

10. The method as claimed in claim 9, further comprising adjusting the predetermined minimum flow rate based on a desired steering speed.

11. The method as claimed in claim 9, wherein the engine/motor speed is ascertained from a current vehicle speed, taking into consideration an engine/motor gear ratio of a vehicle gearshift transmission arranged between the drive engine/motor and a drive shaft of the vehicle.

12. The method as claimed in claim 11, wherein the engine/motor gear ratio has been stored in a transmission control unit or is ascertained during the trip, by an engine/motor gear ratio being calculated from the engine/motor speed and from a transmission output speed transmitted to the drive shaft.

13. The method as claimed in claim 9, wherein a pump speed of the hydraulic pump is determined from the engine/motor speed, and the current flow-rate is determined from the pump speed via a pump characteristic assigned to the hydraulic pump.

14. The method as claimed in claim 13, further comprising determining the pump speed from the engine/motor speed based on a pump gear ratio of a pump gearing arranged between the drive engine/motor and the hydraulic pump.

15. The method as claimed in claim 1, wherein the collision warning signal is output from an emergency-braking control unit, the emergency-braking control unit being designed to output the collision warning signal in the case where an impending collision with a collision object is established.

16. The method as claimed in claim 1, wherein the checking as to whether the current flow-rate exists that is greater than or equal to the minimum flow-rate and also the increasing of the engine/motor speed are controlled by a servo control unit which receives and outputs the corresponding signals via a data-bus connection.

17. The method as claimed in claim 1, wherein the hydraulic servo steering system assists a steering demand which is preset manually by a steering-wheel or which is preset by an automated steering system via an electric motor, wherein via the hydraulic fluid with the current flow-rate, in the collision assistance case, a mechanical conversion of the steering demand into a steering motion of wheels is assisted via a steering mechanism.

18. The method as claimed in claim 1, wherein an increasing of the engine/motor speed is not coupled to a steering demand.

19. A hydraulic servo steering system, comprising:
a hydraulic pump configured to output a hydraulic fluid having a current flow-rate, the current flow-rate being dependent on a pump speed of the hydraulic pump;
a steering mechanism connected to the hydraulic pump via a hydraulic line, the steering mechanism being configured to convert a steering demand mechanically into a steering motion of wheels of the vehicle, and the steering mechanism being designed to be assisted by the hydraulic fluid;
a servo control unit configured to control the servo steering system;
a drive engine/motor, actively linked mechanically with the hydraulic pump and with a vehicle gearshift transmission; and
a servo control unit,
wherein the vehicle gearshift transmission is configured to transmit an engine/motor speed supplied from the drive engine/motor to a drive shaft of the vehicle via an engine/motor gear ratio for the purpose of driving wheels of the vehicle,
wherein the pump speed of the hydraulic pump is dependent on the engine/motor speed, and
wherein the servo control unit is configured to:
in response to a collision warning signal indicating a collision assistance case, determine whether the current flow-rate is greater than or equal to a preset minimum flow-rate;
in response to determining that the current flow-rate is less than the preset minimum flow-rate, adjust the pump speed such that the current flow-rate becomes greater than or equal to the minimum flow-rate.

20. The hydraulic servo steering system as claimed in claim 19, wherein a pump gearing is arranged between the drive engine/motor and the hydraulic pump for the purpose of defining a pump gear ratio and the serve control unit is configured to:
adjust the preset minimum flow rate based on a desired steering speed.

21. The hydraulic servo steering system as claimed in claim 20, wherein the servo control unit is configured to change the pump gear ratio for the purpose of increasing the pump speed in case the current flow-rate in the collision assistance case is less than the minimum flow-rate.

22. The hydraulic servo steering system as claimed in claim 19, wherein the servo control unit is configured to change the engine/motor gear ratio by decreasing the vehicle-transmission gear for the purpose of increasing the engine/motor speed in case the current flow-rate in the collision assistance case is less than the minimum flow-rate.

23. The hydraulic servo steering system as claimed in claim 19, wherein the servo control unit is configured to actuate the drive engine/motor directly via an engine/motor control unit for the purpose of increasing the engine/motor speed in case the current flow-rate in the collision assistance case is less than the minimum flow-rate.

24. A vehicle comprising the hydraulic servo steering system as claimed in claim 19 and an emergency-braking control unit for generating the collision warning signal.

\* \* \* \* \*